Figure 1:
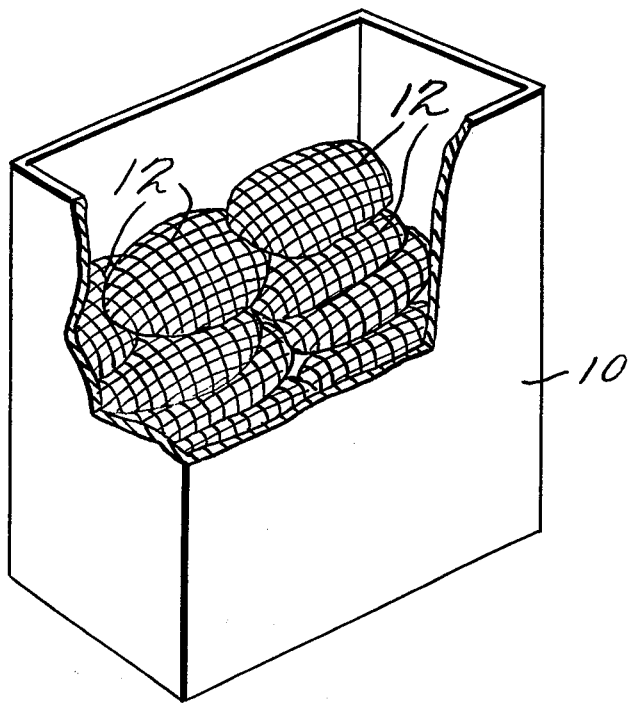

United States Patent [19]
Lunt

[11] 4,005,010
[45] Jan. 25, 1977

[54] METHOD OF PACKING MEDIA IN A TOWER OR BED

[75] Inventor: John Lunt, Alderley Edge, England

[73] Assignee: Imperial Chemical Industries Limited, London, England

[22] Filed: Apr. 13, 1976

[21] Appl. No.: 676,658

Related U.S. Application Data

[63] Continuation-in-part of Ser. No. 499,991, Aug. 23, 1974, abandoned.

[30] Foreign Application Priority Data

Sept. 21, 1973 United Kingdom ............ 44381/73

[52] U.S. Cl. .................................. 210/17; 210/150; 210/282; 261/98; 261/DIG. 72
[51] Int. Cl.[2] ...................... C02C 1/04; B01D 3/28
[58] Field of Search ............................ 261/94–98, 261/DIG. 72; 210/150, 151, 282, 17

[56] References Cited

UNITED STATES PATENTS

| | | | |
|---|---|---|---|
| 799,605 | 9/1905 | Lester | 210/151 |
| 852,780 | 5/1907 | Ellis | 261/98 |
| 1,239,234 | 9/1917 | Tumaltry | 261/96 |
| 2,087,157 | 7/1937 | Lind | 210/282 |
| 2,692,683 | 10/1954 | Mason | 210/282 |
| 3,293,174 | 12/1966 | Johns | 261/94 |
| 3,617,566 | 11/1971 | Oshima et al. | 210/282 |

*Primary Examiner*—Tim R. Miles
*Assistant Examiner*—Gregory N. Clements
*Attorney, Agent, or Firm*—Cushman, Darby & Cushman

[57] ABSTRACT

A method of biological treatment of effluent and the like in a packing tower or bed. Individual plastic packing elements are disposed in open-weave or open-mesh sacks, and are arranged in the tower or bed. Effluent is then passed through the tower or bed, bacteria and the like forming as a biological film on wetted surfaces of the packing elements. The open-weave arrangement allows the passage of air to the biological film, and allows passage of the biological film out of the tower when it becomes loosened from time to time. The sacks are disposed permanently in the tower, no cleaning or the like thereof being necessary.

3 Claims, 2 Drawing Figures

U.S. Patent     Jan. 25, 1977     4,005,010

METHOD OF PACKING MEDIA IN A TOWER OR BED

CROSS-REFERENCE TO RELATED APPLICATIONS

This application is a continuation-in-part of my application, Ser. No. 499,991 filed Aug. 23, 1974 now abandoned.

This invention relates to randomly packed media for the treatment of effluent and sewage. In particular the invention is concerned with a method of packing such media in a tower or bed.

A number of different types of packing media are now available made from a variety of materials such as plastic materials, ceramics and metals and having shapes which provide the media with a large surface area per unit volume. In the specifications of British Pat. Nos. 1,034,076 and 1,082,661 and in copending British Patent Applications Nos. 18823/72 and 3347/73, various plastics packings have been described for use as filter media for biologically treating waste water. There are also a number of other references in the art to use of plastic packings as media for the treatment of effluent and sewage and for their use in mass transfer processes.

In general, packing media of this type are dumped into a tower or bed causing them to adopt a random arrangement in the tower or bed. Where large towers are involved the packings are delivered in containers and the tower is filled by pneumatic methods. For most towers and beds, however, the packings are delivered to the site in plastic sacks, the weight of a typical sack being something like 16 Kg and containing something like 0.2 cubic meter of media, which a site worker can lift and carry about the site. The sacks are then cut open and the contents tipped into the tower or bed. Unfortunately, there is an inherent danger that a whole or part of a sack could be thrown into the tower or bed with the resultant risk of blockage either in the tower itself or in the drainage system.

We have now found that any possibility of blockage of the dumped media or the drainage system by the sacks can be avoided by the simple expedient of delivering the packings to the site in open-weave or open-mesh sacks. Furthermore, we have found that there are positive advantages to be gained by actually filling the tower or bed with the open-weave or open-mesh sacks containing the media.

According to the present invention, in general we provide a method of packing a tower or bed with a media for the treatment of effluent and sewage, the method comprising filling the tower or bed with open-weave or open-mesh sacks containing the media. In particular, according to the method of the present invention the following steps are practiced: disposing a plurality of plastic elements as packing media in each of a plurality of open-weave or open-mesh sacks, the openings in the open-weave sacks being smaller than the smallest dimension of an individual plastic element; filling a tower or bed with a plurality of the open-weave sacks containing the plastic elements (the plastic elements when wetted providing surfaces for growing bacteria and other micro-organisms as a biological film); passing effluent and sewage through the packed tower while supplying through the media and the sacks air required to sustain the growth of bacteria on wetted packing element surfaces, and allowing the biological film to pass through the media and the sacks as it from time to time is dislodged; and retaining the packing media containing sacks in place in the tower or bed for the effective life of the tower or bed. Since the biological film that is dislodged from the wetted plastic element surfaces on which it grows is flushed through the system (the open-weave sacks allowing passage thereof therethrough), the packing media need never be replaced for the effective life of the tower or bed, although there is nothing to preclude it from being replaced should new packing elements that are superior be developed, or for some other reason not related to effective operation of the packing media themselves. In fact, should for any reason, it be necessary to change the packing elements, then a removal can be achieved far more easily than if the elements had merely been freely tipped into the tower or bed.

We also provide a packing unit for filling such a tower or bed the unit comprising an open-weave or open-mesh sack containing a randomly disposed plastics packing media.

Desirably the material used in the construction of the sacks is inert to the chemical and biological attack to which they may be subjected. Suitable constructional materials for most purposes, particularly for biological treatment processes, are polyethylene, polypropylene, polyamide, polyester or any suitable inert synthetic fibre forming polymer. Though the sacks used may have a woven, knitted or other construction such as sacks sold under the Registered Trade Mark "Netlon," we prefer to use a sack having a knitted construction because of strength.

The sacks we use are sufficiently open-weave or open-mesh that they do not interfere in any practical sense with the flow of liquid and gas through the tower or bed. On the other hand, in or er to avoid loss of the packing media from the sack, the smallest dimension of an individual packing will require to be greater than the openings in the weave or mesh of the sack material.

In one embodiment of the invention we arrange that the sacks are incompletely filled with the packings. The term "incompletely filled" means that at least 15% of the available volume within the sack is left unfilled. This allows the packings within a sack to move relative to one another so that they can adopt the available packing space. By this expedient the overall number of packings which can be packed in a given volume will be little different to the number which could be packed by dumping the contents of the sacks into the same volume.

An advantage of plastic packing media over ceramic or metallic packing media is that, because of their lower weight, the lateral forces that the packings exert on the retaining walls of the tower or bed are much lower. If the plastic packings are contained in open-weave or open-mesh sacks and the filled sacks are placed in the tower then lateral forces are reduced even further so that the strength of the retaining walls can be less and the structure therefore can be cheaper. If it is desired to achieve minimum lateral forces in the tower then this can be achieved, in another embodiment of the invention by stacking substantially fully filled sacks in an orderly manner, rather than haphazardly, in the tower. By stacking substantially fully filled sacks in an orderly manner in the tower a very low or even zero lateral thrust results in the tower. The term "substantially fully filled" as used hereinbefore means that less than 15% of the available volume within the sack is left unfilled.

Any of the usual randomly packed packing media such as Raschig rings, Pall rings may be used in the present invention. However, where a particularly high surface area per unit volume packing is required a packing media as described in our copending patent application Nos. 18823/72 and 3347/73 can be used to advantage. A particular feature of this earlier described packing media is that it is produced by extruding a continuous length of transversely corrugated tube which is cut up into short lengths. When such a packing media is then to be packed into an open-mesh sack we arrange that this is done automatically in line with the extruding/cutting process using open-mesh sacking in tubular form.

Apart from the advantages we have mentioned above, a number of other advantages can be achieved by packing a tower or bed in this way. They may be summarized as follows:

1. The contents of the sack can be seen so that if the manufacturer is supplying two or more types of random packing these can be positively identified without opening the sack.

2. There is the possibility that a person may fall into the tower or bed. When a tower or bed has been filled in the usual manner there is a danger that the person would sink to the bottom of the tower or bed due to movement of the packings and have difficulty in climbing out even though the risk of asphyxiation would be low. Using the present method of filling the tower this hazard would be removed because excessive movement of the packings within the tower would not be possible.

3. The possibility of loss of individual packings in high winds is eliminated.

4. The filled sacks being of an open-mesh or open-weave material can be more easily gripped than if the sacks were made of a non-porous plastic sheeting.

Figure 2:
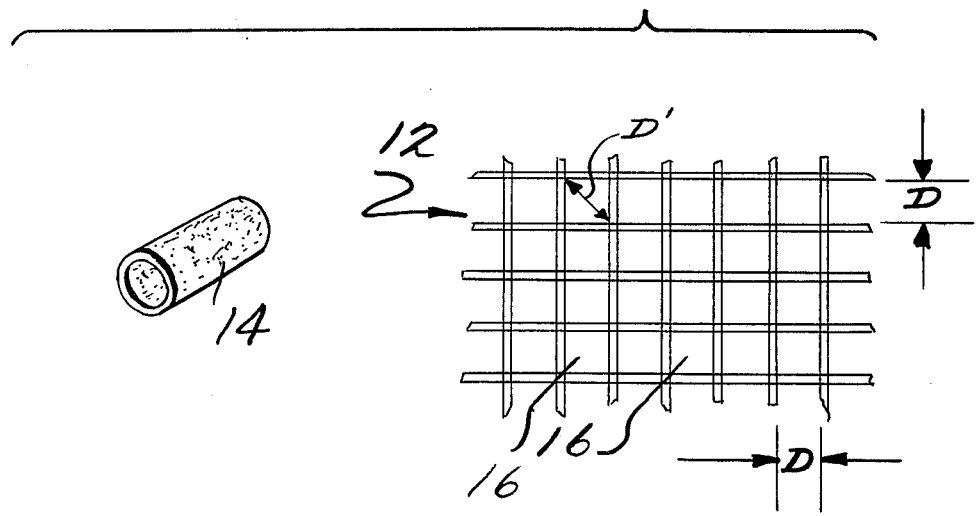

The present invention will now be described by way of Examples, and with reference to the drawing wherein FIG. 1 is a schematic showing of a plurality of bags filled with packing media disposed in a tower for the treatment of sewage or the like, and FIG. 2 is a schematic showing of a plastic packing that may be used in the bags shown in FIG. 1, the packing shown with reference to an exemplary open-weave structure of a bag.

In FIG. 1, a tower 10 is shown for the treatment of effluent and sewage according to the present invention, the tower 10 being filled with a plurality of open-weave or open-mesh bags or sacks 12. As shown in FIG. 1 the sacks 12 are shown in an orderly packing arrangement of rows and columns in the tower 10, however it is to be understood that a random placing of the sacks 12 in the tower 10 may also be utilized if desired. Each sacks 12 contains therein a plurality of plastic packings 14 or the like such as the packings described in British Pat. Nos. 1,034,076 and 1,082,661. The smallest dimension of each of these packings is larger than the largest dimensions D, D' of the openings 16 in the open-weave sacks 12 so that the sacks will always retain the packings 14 therein. The openings 16 are large enough, however, to allow the passage of biological film therethrough, which film may from time to time be dislodged from the surface of the packings 14.

EXAMPLE 1

In this example the filter medium used were cylindrical pieces of polyvinyl chloride. The pieces had an outside diameter of 31.4 mm and the wall terminated in planes which were transverse to the main axis of the cylinders. The walls were transversely corrugated, the corrugations being individual and having a pitch of 3.2 mm, a depth of 2.2 mm and having a castellated form. This corresponded to a developed length of 51 mm.

The pieces were packed into an open-mesh sack made from Netlon. Each sack was approximately 920 mm wide by 2,000 mm long, the mesh of the sack forming a square whose sides were approximately 20 mm long when packed. The individual filaments formed in the manufacture of the sack were approximately 0.4 mm diameter and were made from a polyolefine.

Each filled bag weighed approximately 18 Kg and contained approximately 8,000 pieces. Individual filled bags could be picked up by an individual, particularly as they could be gripped easily.

The filled bags were arranged haphazardly in a square section tower which was 1.8 meters deep and had a 8m$^2$ cross section.

The filter so formed was used to treat domestic effluent which had been subjected to a primary biological treatment process followed by primary settlement. In the treatment process, effluent flowed through the filter without any obstruction by the open mesh sack. Bacteria and other micro-organisms grew as a slimy film on the wetted surfaces of the cylindrical pieces in the filter by feeding on the organic impurity absorbed from the effluent. In time a balanced community of organisms developed on the wetted surfaces within the filter. The biological film was from time to time dislodged from the plastic elements, and it freely passed through the sacks when it was dislodged. The packing media may be retained in the tower for the effective life of the since the biological film passes readily therethrough.

When the filter was matured, the filter was capable of removing 90% of the BOD (bio-chemical oxygen demand) from a domestic effluent feed having a mean BOd of 190 mg/liter which was fed intermittently to the filter at a hydraulic load of 1.80 m$^3$/m$^3$/day.

A similar filter was constructed which was capable of removing 80% BOD from a domestic effluent feed having a mean BOD of 175 mg/liter which was fed continuously to the filter at a hydraulic load of 3.5m$^3$/m$^3$/day.

EXAMPLE 2

Example 1 was repeated except that the open mesh sack used had a length of 1,500 mm i.e., the sack was smaller. This resulted in a substantially completely filled sack which was more rigid than the filled sack of Example 1. The use of a more rigid filled sack allowed the sacks to be stacked in an orderly manner to provide an essentially free standing stack which required only low strength retaining walls for support.

The filter so formed was suitable for treating domestic effluent with the same sort of efficiencies as achieved with the filter described in Example 1.

EXAMPLE 3

A warp knitted, continuous sleeve, net made on a double needle bed machine from 0.2 mm thick polyolefine yarn, the sleeve net having a circumference of 1 meter, was closed at the bottom and filled to a height of 1.2 meter with transversely corrugated polyvinyl chloride tubes. The tubes had the following dimensions: length 25.4 mm; diameter 31.8 mm; wall thickness 0.28 mm; the corrugations were such as to provide a developed length of 51 mm.

The sleeve was then closed by tying leaving about 25 cm of unfilled sleeve and the filled section was severed from the continuous sleeve forming a filled sack. This was repeated until 280 open mesh sacks filled with the tubes had been produced. The sacks each had a circumference of 1.2 meters and a length of 1.2 meters and weighed about 9 Kg and so could easily be handled and carried by one man.

The filled sacks were placed in a sunken bed of circular cross section to a depth of about 2 meters. The diameter of the bed was 5 meters. The sacks, being underfilled due to the excess length of sleeve that had been allowed to remain before the filled sleeve was tied and severed, settled down to almost completely fill the free volume available in the bed. The bed was irrigated by effluent and served as a biological aeration filter and the BOD of the effluent was substantially reduced in the same way as in Example 1.

The method of packing and placing in the bed demonstrated the virtue of the invention in that the cut tubes did not need to be tipped from their container, the filled net sacks could be walked upon with safety and the filled net sacks could withstand high winds without loss of cut tubes from the sacks.

EXAMPLE 4

Filled net sacks were produced in the same manner as described in Example 3, but having only 15 cm of unfilled sleeve so that the net sacks could be said to be substantially filled. The filled sacks were built into an approximately circular cross section stack by placing alternate layers at right angles to the adjacent layer. Due to the fact that the sacks were still slightly underfilled, they settled to a slight extent over those below forming a stable structure. When protected from wind by surrounding with a lightweight cladding consisting of rigid extruded corrugated polyvinyl chloride sheet of the type sold by Imperial Chemical Industries Limited under the Registered Trade Mark "Sintilon" fixed to suitable supports, formed a very inexpensive biological aeration filter when irrigated with liquid effluent.

It will be appreciated that the net sacks need not necessarily be of the type described in the Examples, but any open weave or knitted bag of suitable overall dimensions and strength can be used if the open spaces between yarns are large enough to allow the passage through the spaces of suspended solids in the effluent and yet small enough to retain the packings in the sack.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and procedures.

What is claimed is:

1. A method of biologically treating effluent and sewage comprising the steps of
    a. disposing a plurality of plastic elements as packing media in each of a plurality of open-weave or open-mesh sacks, the openings in said open-weave or open-mesh sacks being smaller than the smallest dimension of an individual plastic element,
    b. filling a tower or bed with a plurality of said open-weave or open-mesh sacks containing said plastic elements therein, said plastic elements when wetted providing surfaces for growing bacteria and other micro-organisms as a biological film,
    c. passing effluent and sewage through said packed tower or bed while supplying through said media and said sacks air required to sustain the growth of the bacteria and other micro-organisms on wetted packing element surfaces, and allowing the biological film to pass through said media and said sacks as it from time to time is dislodged, and
    d. retaining said packing media containing sacks in place in said tower or bed for the effective life of said tower or bed.

2. A method as recited in claim 1 wherein the sacks are substantially filled with said packing elements, and wherein said step of filling said packing tower or bed is accomplished by arranging said filled sacks in an orderly manner within said tower or bed.

3. A method as recited in claim 1 wherein the sacks are incompletely filled with packing elements so that the media may move within the sacks and adopt the available packing space, and wherein said step of filling said packing tower or bed is accomplished by randomly arranging said incompletely filled sacks in said tower or bed so that they adopt the available packing space.

* * * * *